Oct. 5, 1965   B. B. BIDERMAN ETAL   3,210,654
DIRECT CURRENT FLUX DETECTOR
Filed Aug. 7, 1961   2 Sheets-Sheet 1

INVENTORS
BENJAMIN B. BIDERMAN
ARNOLD F. JOHNSON
BY
*Marvin Moody*
ATTORNEY

Oct. 5, 1965       B. B. BIDERMAN ETAL        3,210,654
                   DIRECT CURRENT FLUX DETECTOR
Filed Aug. 7, 1961                              2 Sheets-Sheet 2
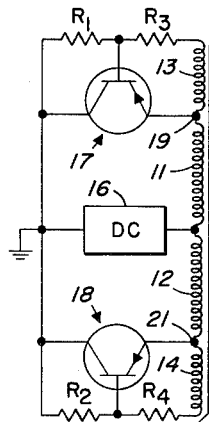
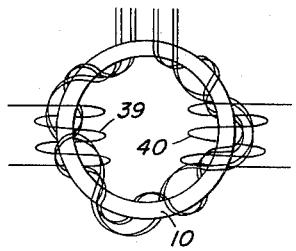
FIG 3
FIG 3b
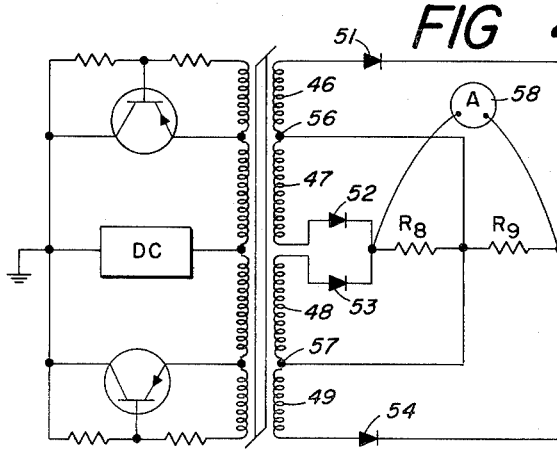
FIG 4
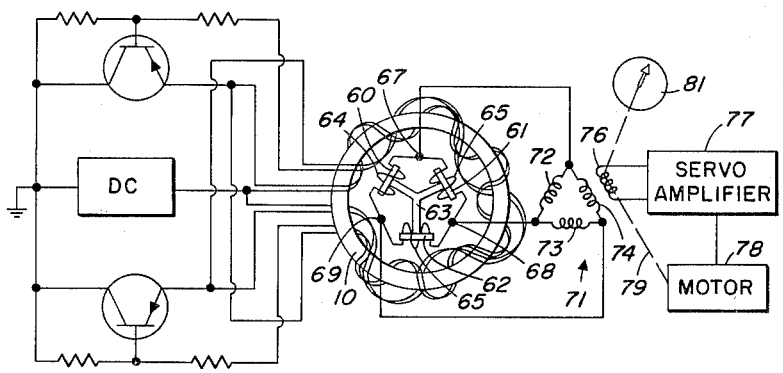
FIG 5
INVENTORS
BENJAMIN B. BIDERMAN
ARNOLD F. JOHNSON
BY
ATTORNEY

United States Patent Office 3,210,654
Patented Oct. 5, 1965

3,210,654
DIRECT CURRENT FLUX DETECTOR
Benjamin B. Biderman, Cedar Rapids, and Arnold F. Johnson, Marion, Iowa, assignors to Collins Radio Company, Cedar Rapids, Iowa, a corporation of Iowa
Filed Aug. 7, 1961, Ser. No. 129,607
4 Claims. (Cl. 324—47)

This invention relates in general to magnetic flux detectors and particularly to magnetic flux detectors capable of operating from direct current power sources.

In many applications it is desirable to measure flux of unknown magnetic fields. For example, a compass measures the earth's magnetic field. Also, magnetic flux detectors can determine the presence of iron and can be used to locate metal objects which affect magnetic fields.

Commonly, magnetic flux detectors of the type shown in Patent No. 2,786,179 have been energized by alternating current since periodic saturation is required in such detectors to modulate the field being detected. However, when the amplitude of the alternating voltage source varies, an insufficient output may be produced and such devices may be rendered inoperative. At times alternating power sources are not available, and such sources are not readily portable.

It is an object of this invention to provide a direct current energized magnetic flux detector which can be constructed so as to fit into a very small case, possibly as small as a package of cigarettes, which can be easily transported. Such a device might be used by surveyors to measure the earth's magnetic field and could be carried in their pockets or attached to their instruments. The invention could also be used in small aircraft. This device might also be used as a detector of studs in the walls of buildings, in that it is capable of locating nails and other metal which affects the earth's magnetic field.

An additional advantage of a direct current flux detector of the type described herein is that fluctuation in the supply voltage affects only the frequency of operation, and does not produce inaccurate indications.

An object of this invention is to provide a magnetic flux detector of simple and inexpensive construction that can be easily transported.

Another object of this invention is to provide a magnetic flux detector in which variations in the power supply do not produce inaccurate indications.

A feature of this invention is found in the provision for a free-running multivibrator, energized by a direct current source, which utilizes a saturable reactor in the form of a toroid to develop an output detectible by servo or phase detector techniques.

Further objects, features, and advantages of the invention will become apparent from the following description and claims when read in view of the accompanying drawings, in which:

FIGURE 3 illustrates the saturable core oscillator of this invention and a half-wave output circuit;

FIGURE 3b is a detailed view of the output windings of FIGURE 3;

FIGURE 4 illustrates a full-wave output circuit in the invention; and

FIGURE 5 illustrates a further modification of the invention.

Figure 1:
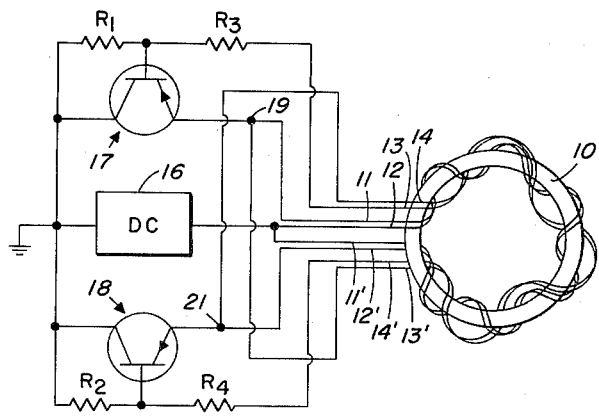
FIGURE 1 illustrates a core according to this invention.

FIGURE 1 illustrates a toroid 10 upon which four windings are wound. Two of the windings 11 and 12 have the same number of turns and are wound together bifilarly as shown in FIGURE 1. The second two windings 13 and 14 are also bifilarly wound on core 10 and are wound upon the toroid with the same number of turns. Windings 11, 12, 13, and 14 serve to saturate the core 10 in opposite directions to modulate magnetic flux. This may be accomplished by the saturable core oscillator circuitry shown in FIGURE 1.

Magnetic oscillators energized by direct current are well known to those skilled in the art; however, the utilization of toroid coils as portions of the oscillator allows the oscillator to energize the flux of a magnetic pickup.

As shown in FIGURE 1, a direct current source which might be, for example, a battery, is indicated by the numeral 16, and has one side connected to ground. A pair of transistors 17 and 18 have their collectors connected to ground. Resistors $R_1$ and $R_2$ are respectively connected between ground and the bases of transistors 17 and 18. The emitter of transistor 17 is connected at 19 to a first end of winding 11. The second end 13' of winding 13 is connected to the emitter of transistor 17. The first end of winding 13 is connected to one side of resistor $R_3$ which has its opposite side connected to the base of transistor 17. The emitter of transistor 18 is connected at 21 to first end of winding 14, which in turn has its opposite end 14' connected to a resistor $R_4$. Resistor $R_4$ has its other side connected to the base of transistor 18. The second end 12' of winding 12 is connected to the emitter of transistor 18. The other ends of windings 11 and 12 are connected to the ungrounded side of power supply 16. Although PNP transistors are illustrated, it is to be realized that NPN's may be substituted by using well-known techniques for such substitution.

The structure shown in FIGURE 1 will operate as a saturable-core square wave oscillator and transistors 17 and 18 will periodically switch on and off in a manner well known to those skilled in the art, so as to periodically saturate core 10 in opposite directions. The windings 13 and 14 are feedback windings which facilitate the oscillatory action of the circuit in a well-known fashion.

Figure 2:
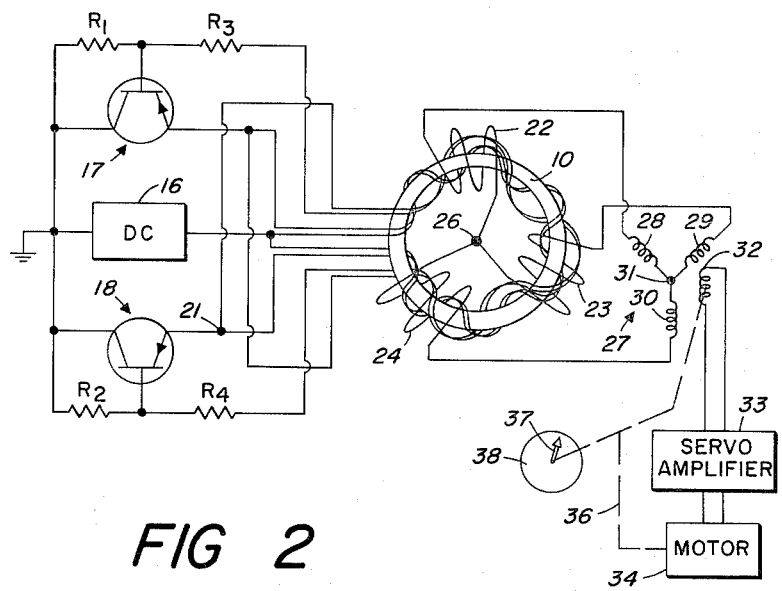
FIGURE 2 illustrates the core of FIGURE 1 connected in circuit with a servo system to indicate direction of the magnetic field being measured.

The structure of FIGURE 1 has been utilized in FIGURE 2 with output windings so as to produce a magnetic flux detector. Three output windings have been wound on core 10 and are symmetrically spaced about its periphery. These windings are designated as 22, 23, and 24, and have first ends that are connected together at point 26. The other ends of windings 22, 23, and 24 are connected to the stator of a control transformer 27. The second end of winding 22 is connected to one end of winding 28, the second end of winding 23 is connected to winding 29, and the second end of winding 24 is connected to winding 30. The other ends of windings 28, 29, and 30 are connected together at a common point 31. A rotor 32 of control transformer 27 supplies an input to servo amplifier 33, which in turn supplies a signal to motor 34. The output shaft 36 of motor 34 is connected to drive the rotor 32 and indicator needle 37 of an indicator 38.

In operation the saturable-core square wave oscillator comprises the windings 11, 12, 13, and 14, transistors 17 and 18, and power supply 16. Such a structure oscillates as is well known to those skilled in the art, resulting in the core 10 being saturated in a first and then second direction due to the reversal of the flux in the windings. This modulates any unknown magnetic field passing through the core 10 and the output windings 22, 23, and 24 will have developed in them a voltage indicative of the direction and magnitude of the unknown field. The control transformer 27 and related servo mechanism comprising the amplifier 33 and motor 34 will drive the rotor 32 to a null position and the indicator will indicate the direction of the magnetic field.

An alternative type of detector is shown in FIGURE 3. In this embodiment windings 39 and 40 are wound on the core 10 on opposite sides and with an equal number of turns. They are connected together at point 41. The other end of winding 39 is connected to a diode 42. The other end of winding 40 is connected to a diode 43. A pair of resistors $R_5$ and $R_6$ are connected between diodes 42 and 43 and their junction is connected to point 41. A capacitor $C_1$ is connected across resistors $R_5$ and $R_6$, and resistor $R_7$ and ammeter 44 are connected across condenser $C_1$.

The windings 39 and 40 and diodes 42 and 43 in combination with the condenser $C_1$ serve as a phase detector, and by noting the alignment of the core 10 when a maximum reading is obtained on ammeter 44 the direction of the magnetic field may be determined. This is true because the flux through windings 39 and 40 will be at a maximum and minimum, respectively, when the core is in alignment with the magnetic field. This is because the unknown magnetic field will add to the excitation flux through one winding and subtract through the other when the core is aligned with it. Thus, by rotating the core 10 in the presence of an unknown field its direction may be determined by observing the maximum reading on ammeter 44.

The circuitry of FIGURE 4 illustrates a full-wave flux detector circuit. Output windings 46, 47, 48, and 49 are mounted symmetrically about toroid core 10. First end of winding 46 is connected to a diode 51. The other end of winding 46 is connected to winding 47. The other end of winding 47 is connected to a diode 52. The other end of diode 52 is connected to a diode 53 which has its other side connected to the winding 48. Winding 48 is connected to winding 49 and the other end of winding 49 is connected to a diode 54.

The diodes 51 and 54 are connected together and to a resistor $R_8$. The other end of $R_8$ is connected to junction points 56 and 57 between windings 46 and 47 and 48 and 49, respectively.

A resistor $R_9$ is connected to diodes 52 and 53 and to resistor $R_8$. An ammeter 58 is connected across $R_9$ and $R_8$.

By rotating the core 10 until a maximum indication is obtained on the ammeter 58, the direction of an unknown magnetic field may be determined. The circuit of FIGURE 4 operates similar to that of FIGURE 3 except the additional windings and diodes result in full-wave detection rather than half-wave detection.

The flux detector shown in FIGURE 5 illustrates the saturable-core square wave oscillator shown in FIGURE 1 in combination with a magnetic flux detector of the type shown in Patent No. 2,786,179. Three cores 60, 61, and 62 are mounted on a Y-shaped support 63 within the confines of core 10 and carry windings 64, 65, and 66. The ends of windings 64, 65, and 66 are connected together in delta and the junctions 67, 68, and 69 are connected to windings 72, 73, and 74 of the stator of a control transformer 71.

A rotor 76 of control transformer 71 supplies an input to servo amplifier 77 which, in turn, supplies an input to servo motor 78. Motor 78 has an output shaft 79 connected to the rotor 76 and an indicator 81 is connected to the motor shaft 79.

In operation, the saturable core oscillator modulates the flux of the unknown field being measured so as to induce voltages in windings 72, 73, and 74 which are sufficiently strong to energize motor 78 and therefore indicate the orientation of the field.

One of the main advantages of this invention is that the frequency of the square wave magnetic core oscillator is determined in part by the applied voltage. Thus, in the event the direct current power supply decreases or varies by a wide factor, only the frequency of oscillation will change. However, the variation in frequency will not normally cause the flux detector to be rendered inoperative or inaccurate. This is true because variations in the direct current source will not affect the saturation of the oscillator core but will only change the frequency of the oscillation. This is in contrast to conventional alternating current excited flux detectors wherein fluctuations of the alternating current supply voltage directly affects the degree of saturation of the core so that a small or no output will be generated.

It is seen that this invention provides means for measuring direction and magnitude of unknown magnetic fields. Although it has been described with respect to preferred embodiments, it is not to be so limited as changes and modifications may be made which are within the full intended scope of the invention as defined by the claims.

We claim:

1. A flux detector comprising a toroidal core, excitation windings wound about said core; a saturable core oscillator including a direct current voltage source and said excitation windings in conjunction with switching means by which current flows alternately and oppositely through said excitation windings so as to alternately and oppositely saturate said toroidal core; a plurality of symmetrically displaced output windings wound about said toroidal core, said output windings having first ends connected in common, a control transformer with stator windings having first ends thereof connected together, the second ends of said output windings connected respectively and individually to the second ends of said control transformer windings, said control transformer having a rotor, a motor connected to the output of said rotor, and the output shaft of said motor being connected to and positioning said control transformer rotor.

2. Apparatus according to claim 1 including an indicator connected to the output shaft of said motor.

3. A flux detector comprising a toroidal core excitation windings wound about said core; a saturable core oscillator including a D.C. voltage source and said excitation windings in conjunction with switching means by which current flows alternately and oppositely through said excitation windings so as to alternately and oppositely saturate said toroidal core; a plurality of output windings mounted symmetrically within said toroidal core, said output windings being mutually symmetrically and angularly displaced such that in the presence of a magnetic field, voltages are induced therein which are collectively definitive of the direction of said magentic field, a control transformer comprising a plurality of stator windings arranged with mutual, symmetrical, angular displacement like that of said output windings, said output windings and said stator windings being mutually interconnected by a plurality of interconnecting lines such that the same impedance is exhibited between any pair of said interconnecting lines; said control transformer comprising a rotor, and a motor connected to the output of said rotor with the output shaft of said motor being connected to and positioning said control transformer rotor.

4. Apparatus according to claim 3 further comprising an indicator connected to the output shaft of said motor.

References Cited by the Examiner

UNITED STATES PATENTS

| | | | |
|---|---|---|---|
| 2,815,499 | 2/27 | Brynes | 324—43 X |
| 2,475,593 | 7/49 | Craddock et al. | 324—43 X |
| 2,528,703 | 11/50 | Muffly | 324—43 |
| 2,786,179 | 3/57 | Arnold et al. | 324—43 |
| 2,823,545 | 2/58 | Bodge | 324—43 |
| 2,942,180 | 6/60 | Coker | 324—43 |
| 2,948,841 | 8/60 | Locanthi et al | 331—113 X |
| 2,954,531 | 9/60 | Johnson | 331—113 |

OTHER REFERENCES

Geyger: AIEE Transactions, volume 79, Part 1, pages 106–112, May 1960.

RICHARD B. WILKINSON, *Primary Examiner.*

FREDERICK M. STRADER, WALTER L. CARLSON, *Examiners.*